(12) United States Patent
Leleannec et al.

(10) Patent No.: US 11,956,430 B2
(45) Date of Patent: Apr. 9, 2024

(54) METHOD AND APPARATUS FOR VIDEO ENCODING AND DECODING BASED ON ASYMMETRIC BINARY PARTITIONING OF IMAGE BLOCKS

(71) Applicant: InterDigital VC Holdings, Inc., Wilmington, DE (US)

(72) Inventors: Fabrice Leleannec, Mouaze (FR); Franck Galpin, Thorigne-Fouillard (FR); Tangi Poirier, Thorigne-Fouillard (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/253,692

(22) PCT Filed: Jun. 13, 2019

(86) PCT No.: PCT/US2019/036929
§ 371 (c)(1),
(2) Date: Dec. 18, 2020

(87) PCT Pub. No.: WO2019/245841
PCT Pub. Date: Dec. 26, 2019

(65) Prior Publication Data
US 2021/0258576 A1    Aug. 19, 2021

(30) Foreign Application Priority Data
Jun. 18, 2018   (EP) ..................................... 18305758

(51) Int. Cl.
*H04N 19/119*   (2014.01)
*H04N 19/124*   (2014.01)
(Continued)

(52) U.S. Cl.
CPC ......... *H04N 19/119* (2014.11); *H04N 19/124* (2014.11); *H04N 19/159* (2014.11);
(Continued)

(58) Field of Classification Search
CPC .. H04N 19/119; H04N 19/124; H04N 19/159; H04N 19/176; H04N 19/18; H04N 19/91
(Continued)

(56) References Cited

U.S. PATENT DOCUMENTS

| 11,412,220 B2* | 8/2022 | Le Leannec ........... H04N 19/14 |
| 2013/0163664 A1 | 6/2013 | Guo et al. |

(Continued)

FOREIGN PATENT DOCUMENTS

| EP | 2629527 A2 | 8/2013 |
| WO | WO 2017123980 A1 | 7/2017 |

(Continued)

OTHER PUBLICATIONS

Albrecht, Description of SDR, HDR, and 360° video coding technology proposal by Fraunhofer HHI, Joint Video Experts Team (JVET) of ITU-T SG 16 WP 3 and ISO/IEC JTC 1/SC 29/WG 11, Apr. 10, 2018 (Year: 2018).*

(Continued)

*Primary Examiner* — Albert Kir
(74) *Attorney, Agent, or Firm* — Condo Roccia Koptiw LLP

(57) ABSTRACT

Different implementations are described, particularly implementations for video encoding and decoding based on asymmetric binary partitioning of image blocks are presented. The encoding method comprises for a picture, wherein at least one component of the picture is divided into blocks of samples, partitioning a block into block partitions, wherein at least one block partition has a size equal to a positive integer different from a power of 2 in width and/or (Continued)

Figure 1:
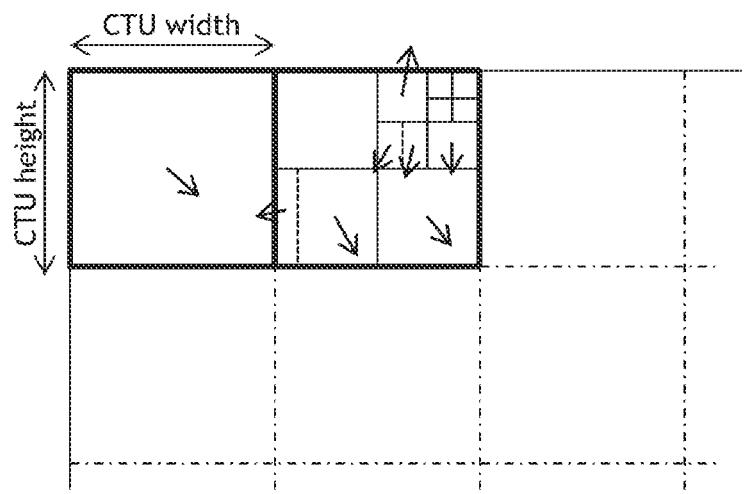

height, obtaining a residual based on a difference between a prediction of the block partitions and the block partitions, splitting the residual into at least two residual blocks with a size equal to a power of 2 in width and height and encoding the at least two residual blocks. Ohers embodiments are presented for a block partitioning on the border of the picture, for setting maximum and/or minimum block sizes and for corresponding decoding method.

28 Claims, 13 Drawing Sheets

(51) Int. Cl.
    *H04N 19/159*     (2014.01)
    *H04N 19/176*     (2014.01)
    *H04N 19/18*     (2014.01)
    *H04N 19/66*     (2014.01)
    *H04N 19/91*     (2014.01)
    *H04N 19/96*     (2014.01)

(52) U.S. Cl.
    CPC .......... *H04N 19/176* (2014.11); *H04N 19/18* (2014.11); *H04N 19/91* (2014.11)

(58) Field of Classification Search
    USPC .................................................. 375/240.12
    See application file for complete search history.

(56) References Cited

U.S. PATENT DOCUMENTS

| | | | |
|---|---|---|---|
| 2018/0070110 | A1 | 3/2018 | Chuang et al. |
| 2018/0367818 | A1* | 12/2018 | Liu ...................... H04N 19/124 |
| 2020/0195924 | A1* | 6/2020 | Hsiang .................. H04N 19/119 |
| 2020/0213590 | A1* | 7/2020 | Kim ........................ H04N 19/18 |
| 2021/0084299 | A1* | 3/2021 | Gao ....................... H04N 19/119 |
| 2021/0112284 | A1* | 4/2021 | Zhang ................... H04N 19/176 |
| 2021/0400306 | A1* | 12/2021 | Xu .......................... H04N 19/66 |

FOREIGN PATENT DOCUMENTS

| | | | | |
|---|---|---|---|---|
| WO | WO-2017219342 | A1 * | 12/2017 | |
| WO | WO-2022019613 | A1 * | 1/2018 | |
| WO | WO-2018037723 | A1 * | 3/2018 | ........... H04N 19/122 |
| WO | WO 2018068762 | A1 | 4/2018 | |
| WO | WO-2018142903 | A1 * | 8/2018 | ............. H04N 19/11 |
| WO | WO-2019244116 | A1 * | 8/2018 | ........... H04N 19/119 |
| WO | WO-2019219066 | A1 * | 11/2019 | ........... H04N 19/105 |
| WO | WO-2019229169 | A1 * | 12/2019 | ........... H04N 19/119 |
| WO | WO-2020003183 | A1 * | 1/2020 | ........... H04N 19/119 |

OTHER PUBLICATIONS

Zheng, X., "Implicit Transform Block Split Process for Asymmetric Partitions", Joint Collaborative Team on Video Coding (JCT-VC) of ITU-T SG 16 WP 3 and ISO/IEC JTC 1/SC 29/WG 11, Document: JCTVC-J0364, 10th Meeting, Stockholm, Sweden, Jul. 11, 2012, 4 pages.

Chen et al, "Partition Only Software of the Video Coding Technology Proposal by Qualcomm and Technicolor", Joint Video Exploration Team (JVET) of ITU-T SG16 WP3 and ISO/IEC JTC/1SC29/WG11, Document: JVET-J0075, 10th Meeting, San Diego, CA, United States, Apr. 10, 2018, 5 pages.

Anonymous, "Series H: Audiovisual and Multimedia Systems, Infrastructure of audiovisual services—Coding of moving video—Conformance Specification for ITU-T H.265 High Efficiency Video Coding", International Telecommunication Union, ITU-T Telecommunication Standardization Sector of ITU, Recommendation ITU-T H.265.1, Oct. 2014, 42 pages.

Leleannec et al, "Asymmetric Coding Units in QTBT", Joint Video Exploration Team (JVET) of ITU-T SG 16 WP 3 and ISO/IEC JTC1/SC29/WG11, Document: JVET-D0064, 4th Meeting, Chengdu, China, Oct. 15, 2016, 8 pages.

Li et al., "Multi-Type-Tree", Joint Video Exploration Team (JVET) of ITU-T SG 16 WP3 and ISO/IEC JTC 1/SC 29/ WG 11, Document: JVET-D0117r1, 4th Meeting, Chengdu, China, Oct. 15, 2016, 3 pages.

Ma et al, "Description of Core Experiment: Partitioning", Joint Video Exploration Team (JVET) of ITU-T SG 16 WP 3 and ISO/IEC JTC 1/SC 29/WG 11, Document JVET-J1021-r5, 10th Meeting, San Diego, California, United States, Apr. 10, 2018, 32 pages.

Chen et al., "Algorithm Description for Versatile Video Coding and Test Model 1 (VTM 1)", Joint Video Experts Team (JVET) of ITU-T SG16 WP3 and ISO/IEC JTC1/SC29/WG11, Document: JVET-J1002 v1, 10th Meeting, San Diego, California, USA, Apr. 10, 2018, 7 pages.

Leleannec et al, "CE1: Asymmetric Binary Tree (tests 1.0.1, 1.0.2, 1.0.3, 1.0.4, 8.0.1 and 8.0.2)", Joint Video Experts Team (JVET) of ITU-T SG 16 WP 3 and ISO/IEC JTC 1/SC 29/WG 11, Document: JVET-K0197-v2, 11th Meeting: Ljubljana, Slovenia, Jul. 10, 2018, 20 pages.

Chen et al., "Algorithm Description of Joint Exploration Test Model 3", Joint Video Exploration Team (JVET) of ITU-T SG16 WP3 and ISO/IEC JTC1/SC29/WG11, Document: JVET-C1001 v1, 3rd Meeting, Geneva, Switzerland, May 26, 2016, 36 pages.

KR 10-2016-0078318 (A), Notice of Allowance dated Jan. 11, 2024, in related Chinese Patent Application No. 201980040727.3. An English language translation is provided.

CN 102648631 (A), US 2015/0281688 (A1).
CN 107005718 (A), US 2019/0313096 (A1).
WO 2015/142075 (A1), US 2018/0176559 (A1).

* cited by examiner

US 11,956,430 B2

METHOD AND APPARATUS FOR VIDEO ENCODING AND DECODING BASED ON ASYMMETRIC BINARY PARTITIONING OF IMAGE BLOCKS

This application claims the benefit, under 35 U.S.C. § 371 of Patent Cooperation Treaty Application PCT/US19/036929, filed Jun. 13, 2019, which was published in accordance with PCT Article 21(2) on Dec. 26, 2019, in English, and which claims the benefit of European Patent Application No. 18305758.7, filed Jun. 18, 2018.

1. TECHNICAL FIELD

A method and an apparatus for encoding a video into a bitstream are disclosed. A corresponding decoding method and apparatus are further disclosed.

2. BACKGROUND

For the compression of video data block-shaped regions of the pictures are coded using inter-picture prediction to exploit temporal redundancy between different pictures of the video source signal or using intra-picture prediction to exploit spatial redundancy in a single picture of the source signal. For this purpose, depending on the used compression standard, a variety of block sizes in the picture may be specified. The prediction residual may then be further compressed using a transform to remove correlation inside the transform block before it is quantized and finally even more compressed using entropy coding.

In the HEVC video compression standard, also known as recommendation ITU-T H.265, a picture is divided into so-called Coding Tree Units (CTUs), which are the basic units of coding, analogous to Macroblocks in earlier standards. A CTU usually comprises three Coding Tree Blocks, a block for luminance samples and two blocks for chrominance samples, and associated syntax elements. The Coding Tree Units can be further split into Coding Units (CUs), which are the smallest coding elements for the prediction type decision, i.e. whether to perform inter-picture or intra-picture prediction. Finally, the Coding Units can be further split into one or more Prediction Units (PUs) in order to improve the prediction efficiency. Furthermore, for coding the prediction residual the CUs can be split into Transform Units (TUs), wherein a Transform Unit encapsulates transform blocks that each are square blocks of samples for the picture components to which the same transform is applied. It is to be noted that the Transform Units do not have to be aligned with Prediction Units so that it is e.g. possible to perform a single transform across residuals from multiple Prediction Units and vice versa.

In the HEVC standard, a variety of block sizes are defined for the various logical coding units and the corresponding coding blocks so that an appropriate adjustment or selection during the encoding and decoding process allows to optimize the compression efficiency. The partitioning of coding units in HEVC always follows the quad-tree splitting process, which consists in dividing a CU into 4 sub coding units (sub-CUs) with equal size. Thus, all HEVC coding units have square shape, and their width and height are equal to a power of 2.

In particular for asymmetric binary partitioning of image blocks there is a need for increased flexibility in the coding unit representation and splitting to optimize the trade-off between encoder and decoder complexity and compression efficiency.

3. SUMMARY

According to an aspect of the present disclosure, a method for encoding a picture is disclosed, wherein at least one component of the picture is divided into one or more blocks of samples. Such a method comprises partitioning a block into block partitions, wherein at least one block partition has a size equal to a positive integer different from a power of 2 in width and/or height; obtaining a residual based on a difference between a prediction of the block partitions and the block partitions; splitting the residual into at least two residual blocks with a size equal to a power of 2 in width and height; and transforming the at least two residual blocks into transform coefficients, quantizing the transform coefficients, and entropy coding of the quantized transform coefficients.

According to another aspect of the present disclosure, an apparatus for encoding a picture is disclosed, wherein at least one component of the picture is divided into one or more blocks of samples. Such an apparatus comprises means for partitioning a block into block partitions, wherein at least one block partition has a size equal to a positive integer different from a power of 2 in width and/or height; means for generating a residual by predicting the block partitions and subtracting the prediction from the block partitions; means for splitting the generated residual into at least two residual blocks with a size equal to a power of 2 in width and height; and means for transforming the at least two residual blocks into transform coefficients, quantizing the transform coefficients, and entropy coding of the quantized transform coefficients.

According to an aspect of the present disclosure, an apparatus for encoding a picture is provided, the apparatus including a processor, and at least one memory coupled to the processor, the processor being configured to partition a block into block partitions, wherein at least one block partition has a size equal to a positive integer different from a power of 2 in width and/or height; to obtain a residual based on a difference between a prediction of the block partitions and the block partitions; to split the residual into at least two residual blocks with a size equal to a power of 2 in width and height; and to transform the at least two residual blocks into transform coefficients, quantizing the transform coefficients, and entropy coding of the quantized transform coefficients.

According to another aspect of the present disclosure, a method for decoding a video is disclosed, wherein at least one component of the picture is divided into one or more blocks of samples. Such a method comprises receiving in a bitstream quantized transform coefficients; entropy decoding, de-quantizing and inverse transforming the transform coefficients to obtain residual blocks with a size equal to a power of 2 in width and height; merging at least two residual blocks to reconstruct a residual for a block partition having a size equal to a positive integer different from a power of 2 in width and/or height; and reconstructing a block of the picture based on a prediction of the block partitions and the block partitions.

According to another aspect of the present disclosure, an apparatus for decoding a video is disclosed, wherein at least one component of the picture is divided into one or more blocks of samples. Such an apparatus comprises means for receiving in a bitstream quantized transform coefficients; means for entropy decoding, de-quantizing and inverse transforming the transform coefficients to obtain residual blocks with a size equal to a power of 2 in width and height; means for merging at least two residual blocks to reconstruct a residual for a block partition having a size equal to a positive integer different from a power of 2 in width and/or height; and means for reconstructing a block of the picture based on a prediction of the block partitions and the block partitions.

According to an aspect of the present disclosure, an apparatus for decoding a video is provided, the apparatus including a processor, and at least one memory coupled to the processor, the processor being configured to receive in a bitstream quantized transform coefficients; to entropy decode, de-quantize and inverse transform the transform coefficients to obtain residual blocks with a size equal to a power of 2 in width and height; to merge at least two residual blocks to reconstruct a residual for a block partition having a size equal to a positive integer different from a power of 2 in width and/or height; and to reconstruct a block of the picture based on a prediction of the block partitions and the block partitions.

The present disclosure also provides a signal comprising video data generated according to the method or the apparatus of any of the preceding descriptions. The present embodiments also provide a computer program product including instructions, which, when executed by a computer, cause the computer to carry out the methods described.

The present disclosure also provides a computer readable storage medium having stored thereon a bitstream generated according to the methods described above. The present disclosure also provides a method and apparatus for transmitting the bitstream generated according to the methods described above.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

Additional features and advantages of the present disclosure will be made apparent from the following detailed description of illustrative embodiments which proceeds with reference to the accompanying FIGS.

4. BRIEF DESCRIPTION OF THE DRAWINGS

Figure 2:
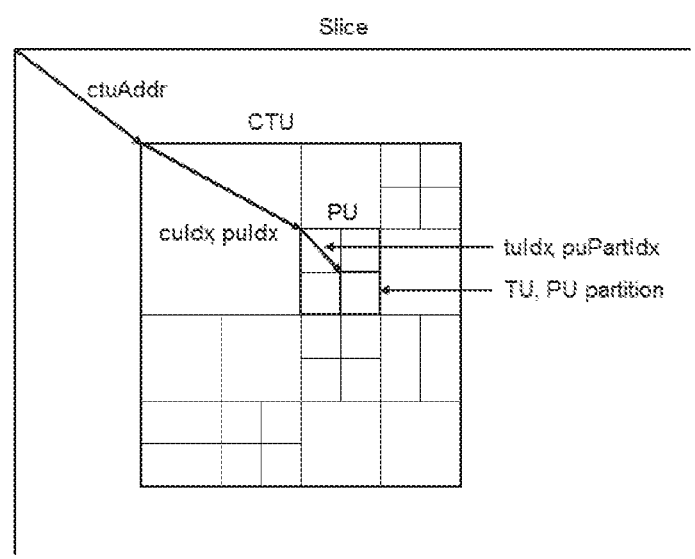
Figure 3:
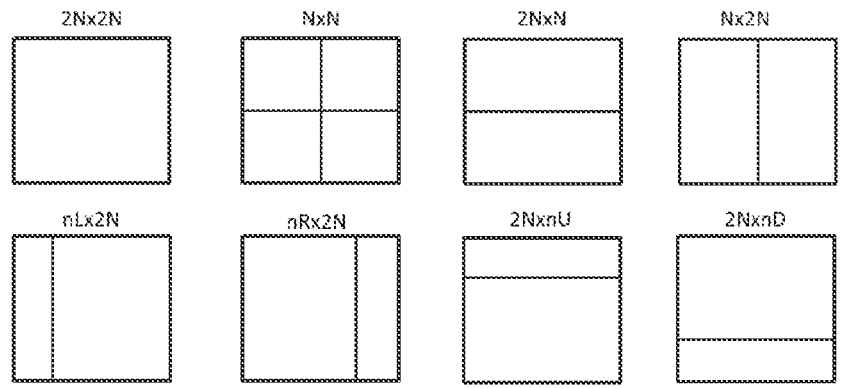
Figure 4:
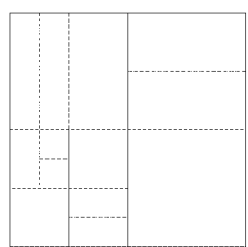
Figure 5:
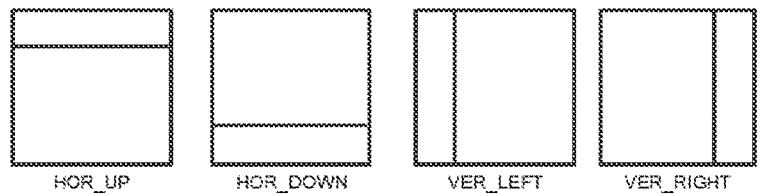
Figure 6:
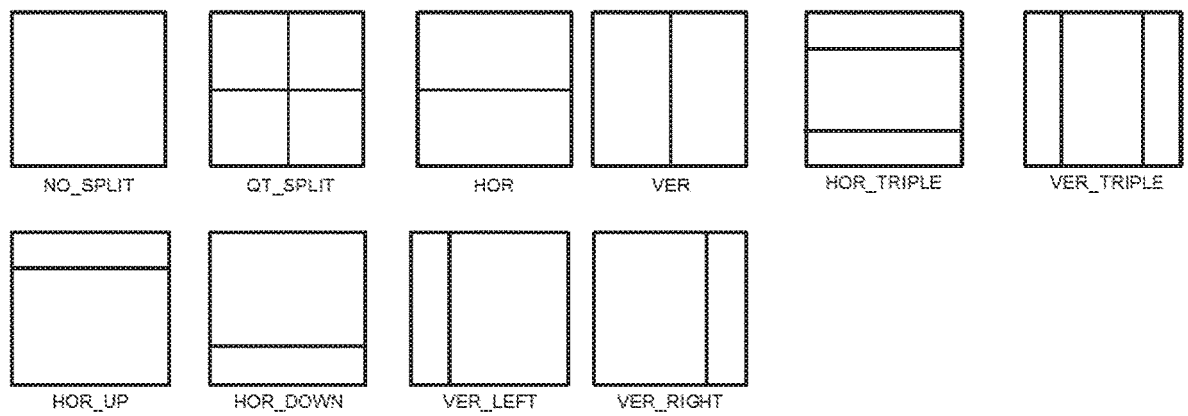
Figure 7:
Figure 8:
Figure 9:
Figure 10:
Figure 11:
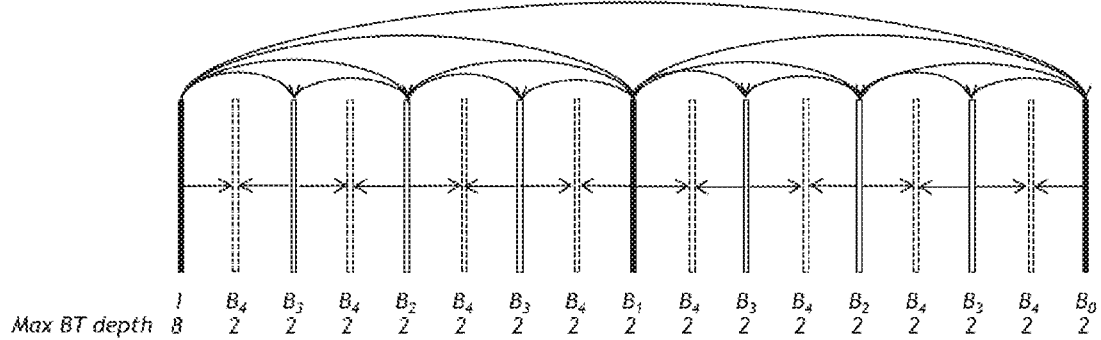
Figure 12:
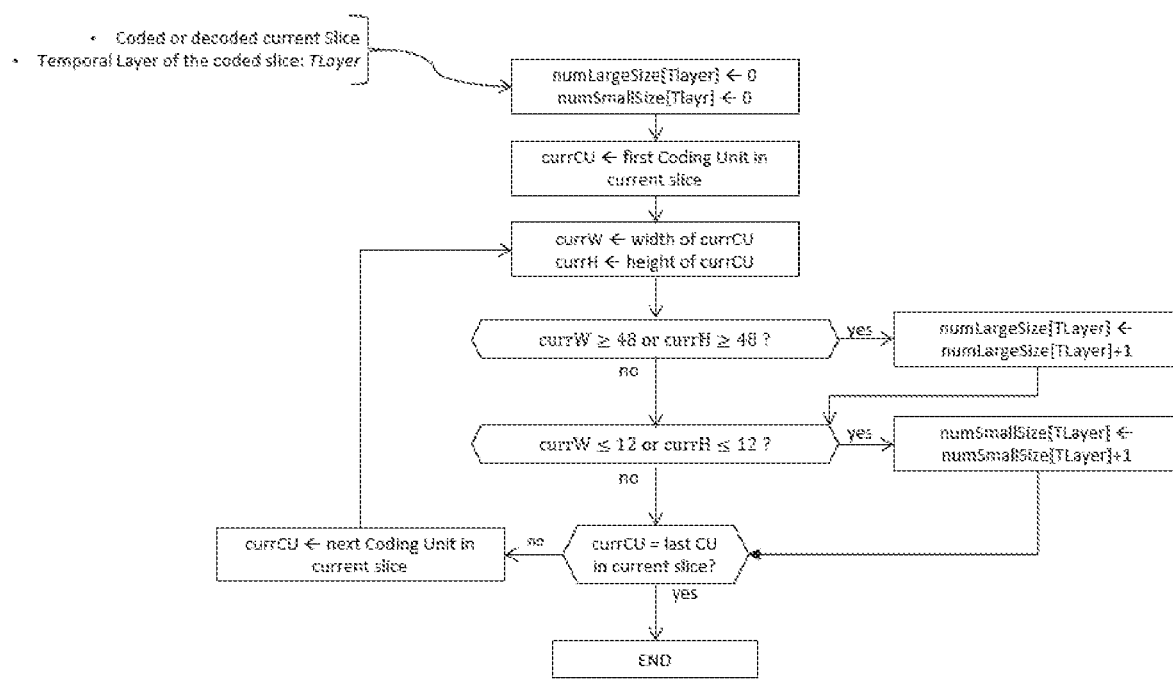
Figure 13:
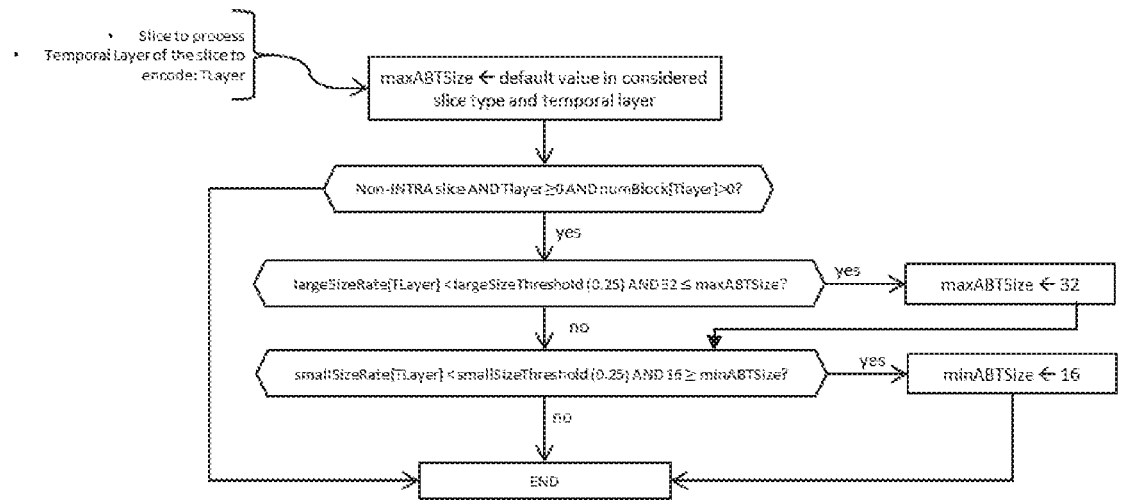
Figure 14:
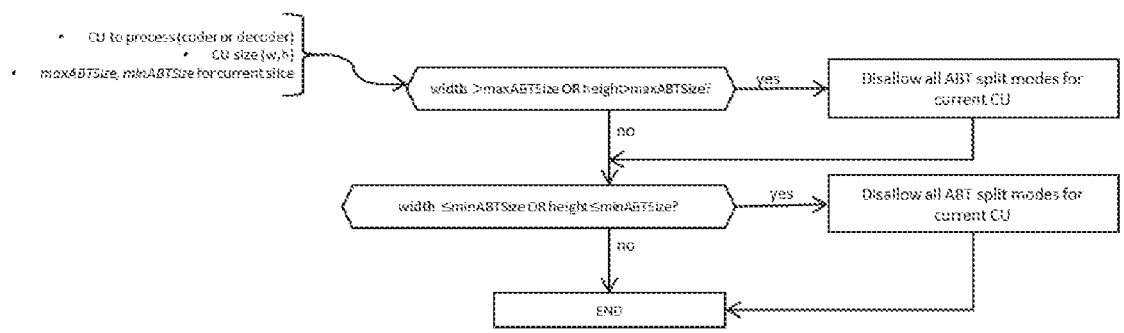
Figure 15:
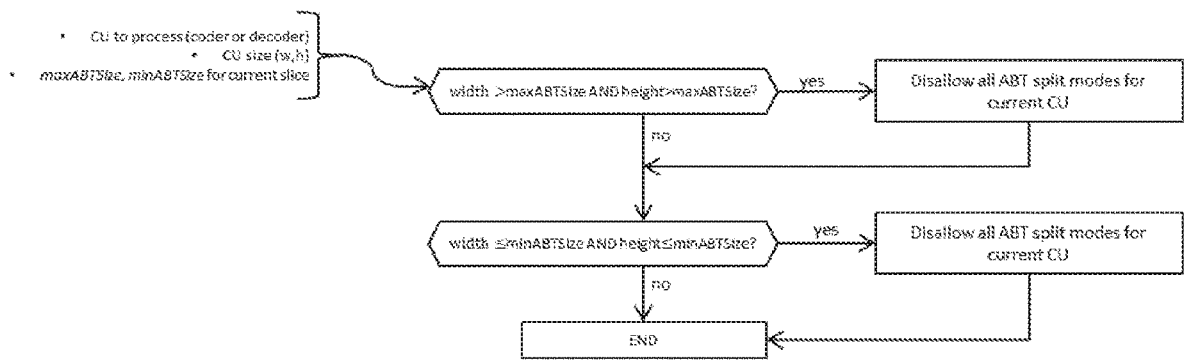
Figure 16:
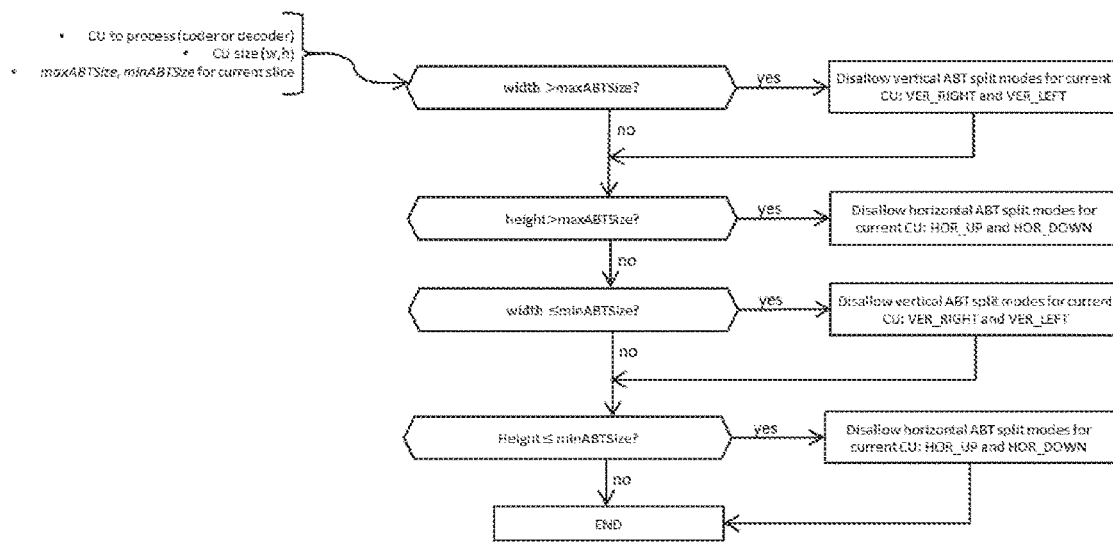
Figure 17:
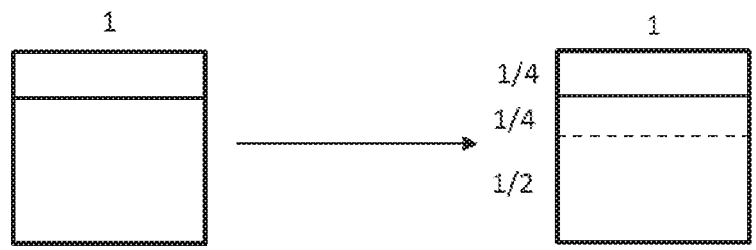
Figure 18:
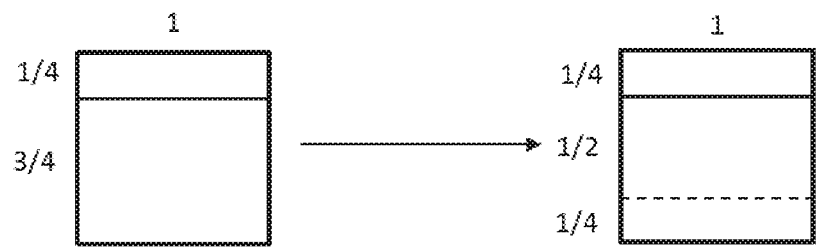
Figure 19:
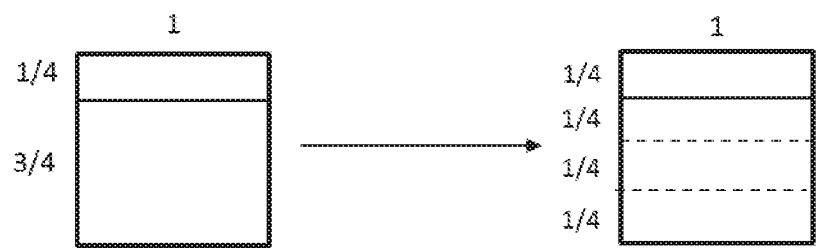
Figure 20:
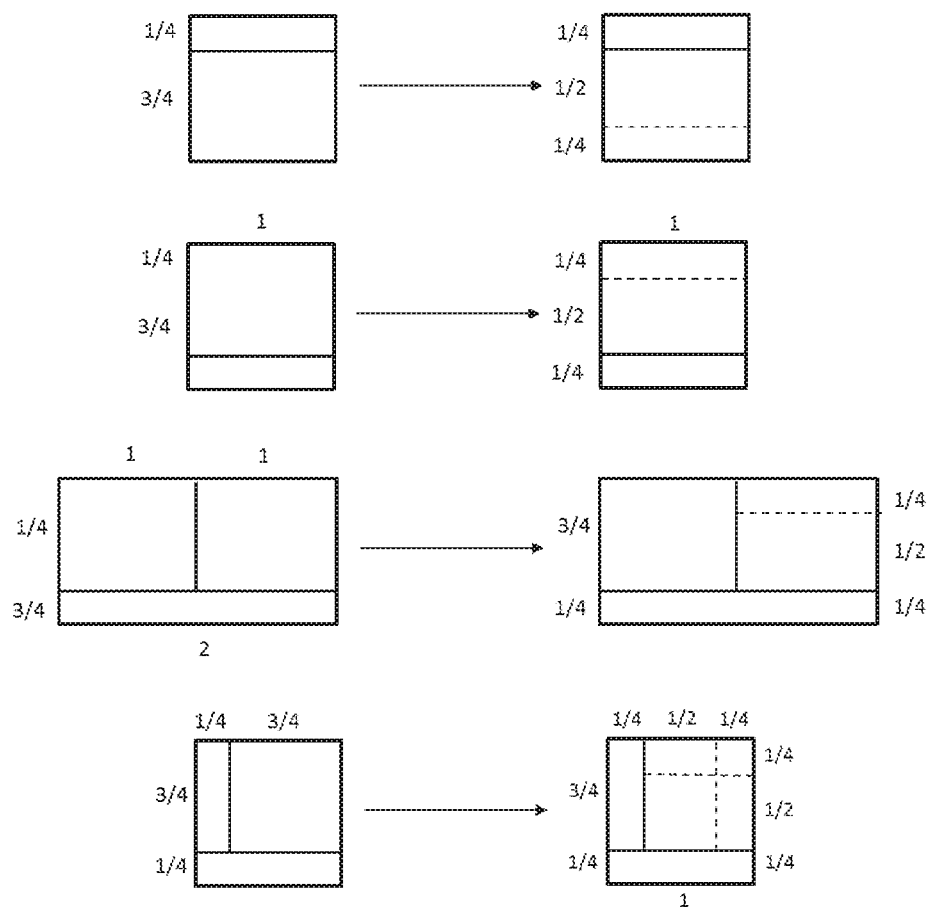
Figure 21:
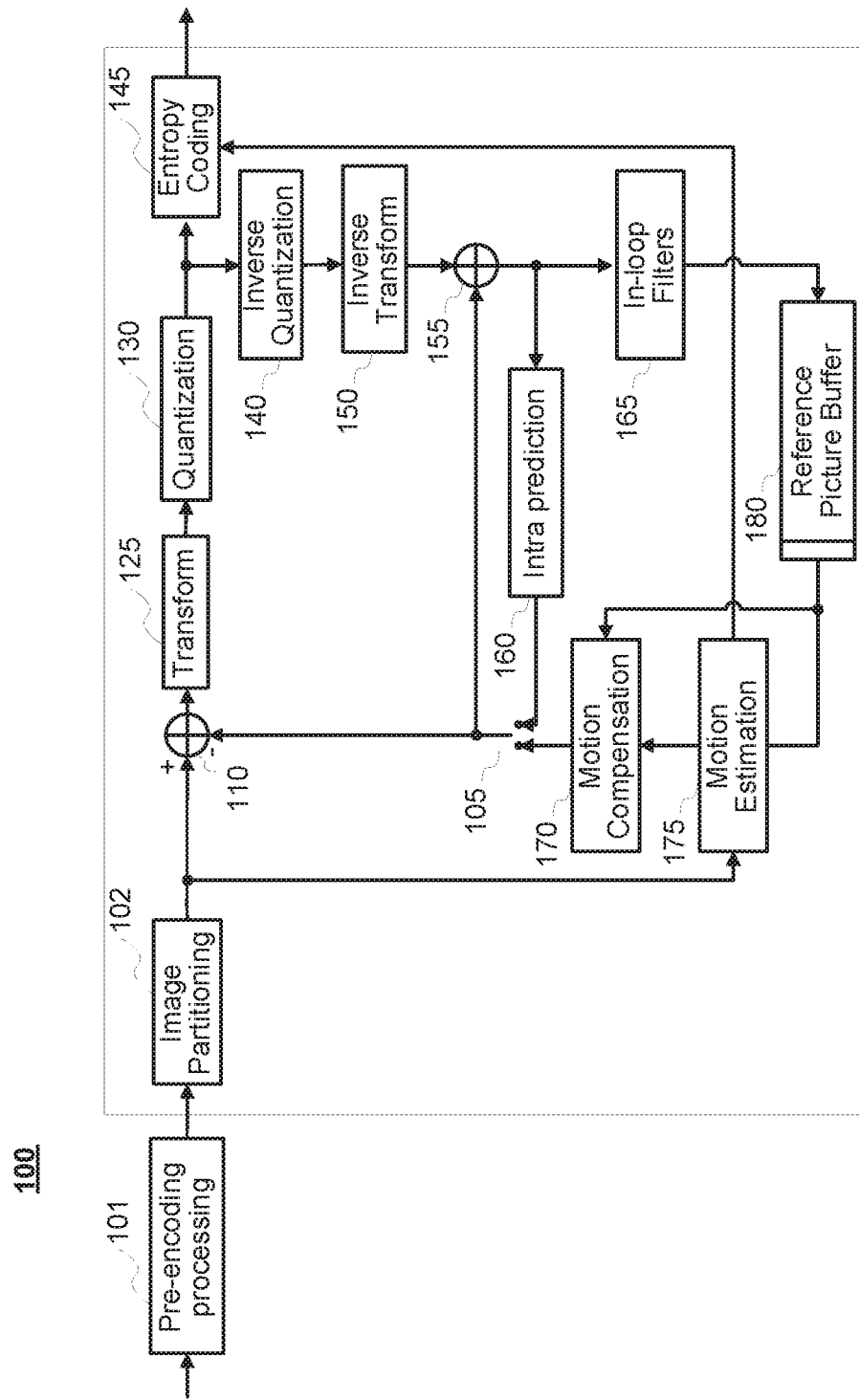
Figure 22:
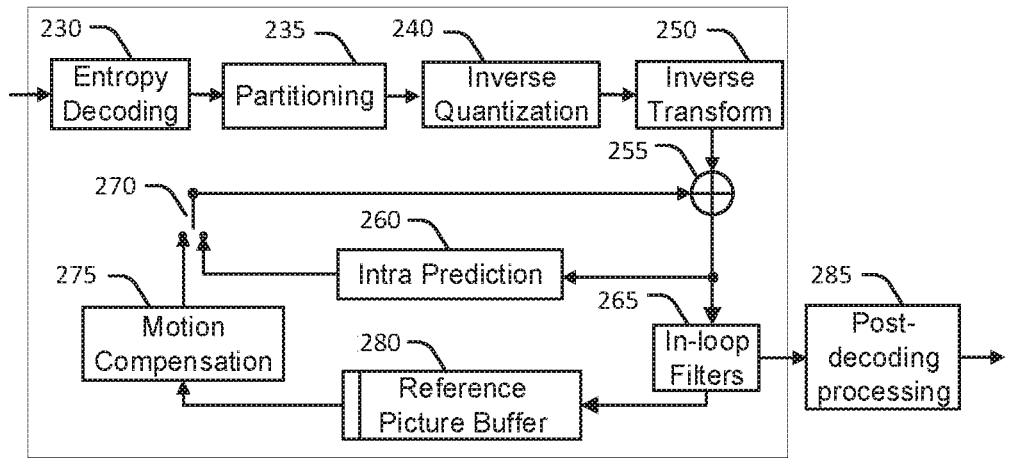
Figure 23:
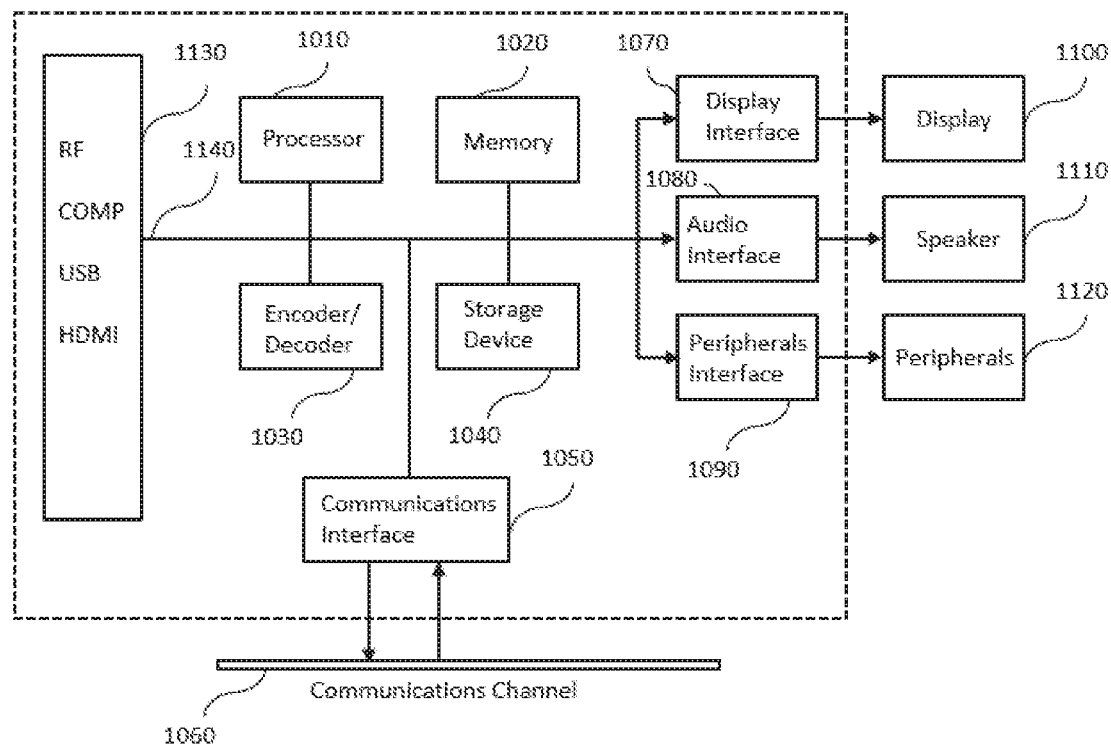
Figure 24:
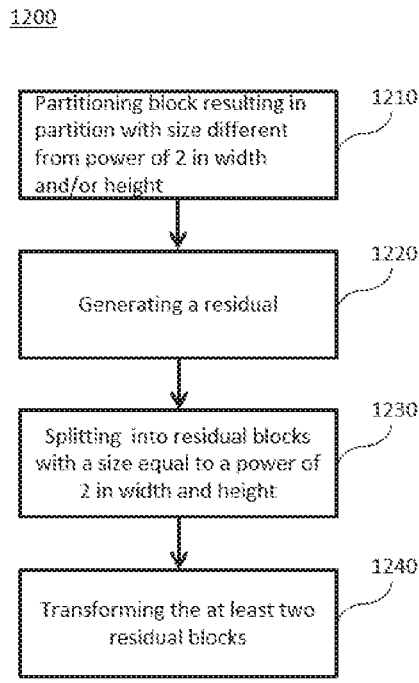
Figure 25:
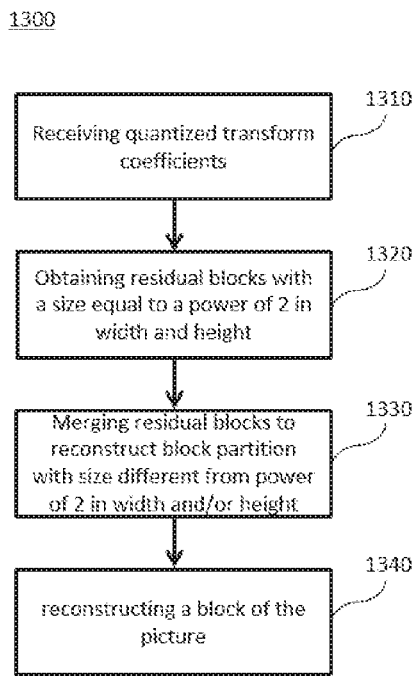

FIG. 1 illustrates a Coding Tree Unit and the Coding Tree concept to represent a coded picture according to the HEVC standard, FIG. 2 illustrates a division of a Coding Tree Unit into Coding Units, Prediction Units and Transform Units according to the HEVC standard, FIG. 3 illustrates the various partition types used in the HEVC standard for partitioning of Coding Units into Prediction Units, FIG. 4 illustrates an example where a Coding Tree Unit is split both in a quad-tree and in a binary-tree fashion and the corresponding coding tree representation of the Coding Tree Unit, FIG. 5 illustrates additional Coding Unit binary asymmetric splitting modes, FIG. 6 illustrates an extended set of possible CU split modes, including a horizontal and vertical triple tree split mode, FIG. 7 illustrates an example of coding structures chosen to encode an exemplary picture with Quad-Tree decomposition of Coding Tree Units and Binary-Tree decomposition embedded into the Quad-Tree, FIG. 8 illustrates an example of block partitioning on the picture border of an exemplary picture using only Quad-Tree decomposition, FIG. 9 illustrates an example of block partitioning on the picture border of an exemplary picture using only Quad-Tree and Binary-Tree decomposition, FIG. 10 illustrates an example of block partitioning on the picture border of an exemplary picture using Quad-Tree, Binary-Tree and Asymmetric-Binary-Tree decomposition according to an embodiment of the present disclosure, FIG. 11 illustrates a hierarchical B picture temporal coding structure, FIG. 12 illustrates the computation of the frequency of usage of large and/or small block size in a given slice of a given temporal layer according to a second embodiment of the present disclosure, FIG. 13 illustrates the adjustment of the maximum and/or minimum block size for which Asymmetric-Binary-Tree partitioning is allowed according to a second embodiment of the present disclosure, FIG. 14 illustrates a method to limit the use of Asymmetric-Binary-Tree partitioning modes according to a first variant of second embodiment of the present disclosure, FIG. 15 illustrates a method to limit the use of Asymmetric-Binary-Tree partitioning modes according to a second variant of second embodiment of the present disclosure, FIG. 16 illustrates a method to limit the use of Asymmetric-Binary-Tree partitioning modes according to a third variant of second embodiment of the present disclosure, FIG. 17 illustrates a method to split a Coding Unit with a size equal to a multiple of 3 in width or height into two Transform Units with a size equal to a power of 2 according to a first variant of a fourth embodiment of the present disclosure, FIG. 18 illustrates a method to split a Coding Unit into two Transform Units according to a second variant of a fourth embodiment of the present disclosure, FIG. 19 illustrates a method to split a Coding Unit into three Transform Units according to a third variant of a fourth embodiment of the present disclosure, FIG. 20 illustrates a method to split a Coding Unit into Transform Units by emulating a Triple Tree partitioning according to a fourth variant of a fourth embodiment of the present disclosure, FIG. 21 illustrates an exemplary encoder according to an embodiment of the present disclosure, FIG. 22 illustrates an exemplary decoder according to an embodiment of the present disclosure, FIG. 23 illustrates a block diagram of an example of a system, in which various aspects and embodiments are implemented, FIG. 24 illustrates a decoding method according to an embodiment of the present disclosure, FIG. 25 illustrates a coding method according to an embodiment of the present disclosure.

5. DESCRIPTION OF EMBODIMENTS

The technical field of one or more implementations is generally related to video compression. At least some embodiments further relate to improving compression efficiency compared to existing video compression systems. At least one embodiment proposes improving the Asymmetric Binary partitioning of blocks in terms of compression efficiency, trade-off between encoding time and compression, and support for only transforms with a size equal to a power of 3.

In the HEVC video compression standard, a picture is divided into so-called Coding Tree Units (CTU), which size is typically 64×64, 128×128, or 256×256 pixels. Each CTU is represented by a Coding Tree in the compressed domain. This is a quad-tree division of the CTU, where each leaf is called a Coding Unit (CU) as shown in FIG. 1, which depicts two CTUs. In this case, the left CTU is directly used as is while the right CTU is partitioned into multiple smaller sections based on the signal characteristics of the picture region covered by the CTU. The arrows indicate the prediction motion vectors of the respective section.

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level as shown on FIG. 2.

The Partitioning of a Coding Unit into Prediction Unit(s) is done according to the partition type, signaled in the bit-stream. For an Intra coding unit, only the partition types 2N×2N and N×N, illustrated in FIG. 3, are used. This means only square Prediction Units are used in Intra Coding Units. On the contrary, Inter Coding Units can use all partition types shown in FIG. 3.

According to the HEVC standard, Coding Units are also divided into so-called transform units, in a recursive way, following a "transform tree". Thus, a transform tree is a quad-tree division of a coding unit, and transform units are the leaf of the transform tree. A transform unit encapsulates the square transform blocks of each picture component corresponding to a considered square spatial area. A transform block is a square block of samples in a single component, where the same transform is applied.

New emerging video compression tools include a Coding Tree Unit representation in the compressed domain, which allow to represent picture data in a more flexible way in the compressed domain. The advantage of this flexible representation of the coding tree is that it provides increased compression efficiency compared to the CU/PU/TU arrangement of the HEVC standard. The so-called Quad-Tree plus Binary-Tree (QTBT) coding tool provides this increased flexibility. It consists in a coding tree where coding units can be split both in a quad-tree and in a binary-tree fashion. An example of a block partitioning of a Coding Tree Unit using QTBT and the corresponding coding tree representation is illustrated in FIG. 4.

The splitting of a coding unit is decided on the encoder side through a rate distortion optimization procedure, which consists in determining the QTBT representation of the CTU with minimal rate distortion cost. In the QTBT technology, a CU has either square or rectangular shape. The size of a coding unit is always a power of 2, and typically goes from 4 to 128. In addition to this variety of rectangular shapes for a coding unit, this new CTU representation has the following different characteristics compared to HEVC.

The QTBT decomposition of a CTU is made of two stages: first the CTU is split in a quad-tree fashion, then each quad-tree leaf can be further divided in a binary fashion. This is illustrated on the right of FIG. 4 where solid lines represent the quad-tree decomposition phase and dashed lines represent the binary decomposition that is spatially embedded in the quad-tree leaves. In each splitting node of the binary tree a flag signals whether horizontal splitting (0) or vertical splitting (1) was used, for the Quad-Tree splitting no indication of the splitting type is needed.

In intra slices, the Luma and Chroma block partitioning structure is separated, and decided independently.

No more CU partitioning into predictions units or transform units is employed. In other words, each Coding Unit is systematically made of a single prediction unit (previously 2N×2N prediction unit partition type) and single transform unit (no division into a transform tree).

At least one embodiment in the domain of picture coding unit representation in compression, improves compression efficiency compared to QTBT technology.

FIG. 5 illustrates an additional CU binary asymmetric splitting mode proposed in Asymmetric Coding Units Codec Architecture. Coding Units with new rectangular shapes are introduced which result from a new Binary Splitting Mode called asymmetric splitting mode. This means new rectangular CU shapes are added. These new shapes consist in sizes equal to $3 \cdot 2^n$ in width and/or height. Furthermore, a CU with a size multiple of 3 in width or height can be further split in a binary fashion, horizontally or vertically.

As a consequence, a square coding unit with size (w,h) (width and height) that would be split through one of the proposed asymmetric binary splitting modes, for example HOR_UP (horizontal-up), would lead to 2 sub-coding units with respective rectangular sizes $$\left(w, \frac{h}{4}\right)$$

and $$\left(w, \frac{3h}{4}\right).$$

In addition, the so-called triple tree partitioning of a CU may be used, leading to the set of possible partitions given in FIG. 6. Triple tree consists in splitting a CU into tree sub-CU with size (1/4, 1/2, 1/4) relative to the parent CU, in the considered orientation.

FIG. 7 illustrates the coding units chosen by the encoder for an exemplary picture. One sees that asymmetric coding units are often used in this exemplary picture. One also notes that these additional coding unit topologies help in having coding structures that spatially match the structures and discontinuities contained in the original signal.

The following section describes at least one implementation. It is organized as follows. First, various implementations of a first embodiment improving block partitioning on the border of the picture are described. Then, different implementations of a second embodiment, implemented either on the encoder side or on decoder side, adapting the asymmetric binary partitioning according to the block size are described. Besides, new heuristics for fast rate distortion search of the coding tree are disclosed. Finally, at least one embodiment for support for ABT (Asymmetric Binary Tree split) with only transform sizes equal to a power of 2 is proposed.

Improved Block Partitioning on the Border of the Picture

In the Versatile Video Codec reference software (called VTM-1.0 or BMS-1.0 hereafter), block partitioning on the picture border is handled by splitting the current block either in a quad-tree fashion or in a symmetric binary tree fashion, in the orientation of the picture border. In BMS-1.0, if the current block lies partially outside the current picture, then the Triple Tree splitting is not allowed, and the symmetric binary split mode is marked as implicit. Implicit split means that it is the only split allowed (except Quadtree split that is processed separately), which also means the decoder infers this split without any dedicated split mode parsing. With the introduction of Asymmetric binary split, we propose to use Asymmetric binary split as implicit split if the split is exactly on the picture boundary. In this case using ABT split leads to bigger CU, thus better coding efficiency.

This is depicted for an exemplary picture in FIGS. 8 to 10, which show the picture boundary handling for different partitioning methods. FIG. 8 show the resulting partitioning when only QuadTree splitting is applied, FIG. 9 for QuadTree and BinaryTree splitting and FIG. 10 with QuadTree, BinaryTree and AsymmetricBinaryTree splitting. As can be seen in FIG. 10, using ABT splitting leads to bigger CU, e.g. at the bottom-left picture corner.

Adaptive Use of Asymmetric Binary Partitioning According to the Block Size at the Encoder and Decoder Side This section describes an implementation of a normative method for constraining the use of ABT, in a way that improves the trade-off between encoding time and compression efficiency.

The method comprises activating the asymmetric binary split modes (HOR_UP, ..., VER_RIGHT) according to the size of the Coding Unit that is about to be partitioned, and according to the average usage rate of large and/or small block sizes in already coded/decoded slices in the same Intra Period.

Indeed, the asymmetric binary partitioning tool introduces the new block sizes 6, 12, 24 and 48. The block size 6 is typically used in chroma only, which in 420 color format corresponds to a block size 12 in the luma component.

It has been noticed that the large block size 48 may be of interest for compression efficiency on a certain type of video content. Moreover, the block size 12 is widely used on many types of video contents, but is of limited interest on the video content where larger block sizes (e.g. 32, 48, 64) are of interest.

According to a variant of the second embodiment, the method here consists in setting a maximum and/or a minimum CU size (in width or height) for which the asymmetric binary partitioning is allowed.

Such a maximum and/or a minimum CU size is considered for each slice to be encoded and decoded.

According to a variant of the second embodiment, the activation or deactivation of ABT (Asymmetric Binary Tree) for some block sizes only takes place in non-INTRA slices or picture, or tile group or tile (namely Inter slices of type P or B).

According to another variant of the second embodiment, the maximum and/or a minimum CU size is being signaled in the slice header, and obtained by the decoder while parsing the slice header. According to another variant of the second embodiment, the maximum/minimum CU size threshold is determined on the decoder side in the same way as on the encoder side.

According to another variant of the second embodiment, the maximum and/or minimum size threshold is determined for each slice, as a function of the temporal layer of the considered slice. The temporal layer corresponds to the temporal scalability layer in a video that is coded according to the hierarchical B picture structure shown in FIG. 11.

FIG. 12 illustrated an embodiment of a method for computing the frequency of large and/or small block usage in a slice in a given temporal layer. The method comprises counting the total number of blocks in the considered slice, and the total number of large and/or small blocks in the slice. By large block, one understands a block that is larger than or equal to a given threshold (for instance 48) in width or height. By small block, one understands a block that is smaller than or equal to a given threshold (for instance 12) in width or height. Hence a CU of size 48×4 is considered as a large block here. Moreover, a CU of side 12×32 is considered of small size here. This larger/small block usage rate is computed on the encoder side. According to a variant of the second embodiment, the larger/small block usage rate is also computed on the decoder side. Note that on the encoder side, the method of FIG. 12 is performed for each slice, once the slice is encoded.

Based on the computed frequency of large/small block in already coded slices in a given temporal layer, the encoder determines the maximum and/or minimum block size for which the asymmetric binary partitioning is allowed. This process is shown in FIG. 13. These maximum and minimum block sizes are respectively noted maxABTSize and minABTSize.

According to an embodiment, the method comprises, for a given slice, with temporal layer TLayer, which is to be encoded, a test if a previous slice has been coded in the current Intra Period, in the current temporal layer. This is determined by testing if the number of coded blocks numBlock[TLayer] is strictly higher than zero. If so, the frequency of use of large blocks in the previous slice at same temporal layer is compared to a threshold (typically 25%). If it is lower than the threshold, then a constraint is put onto the maxABTSize value. Typically, this value is set to 32 in that case. This will disallow the use of ABT in blocks of size 64 or higher in the next slice to process.

Similarly, the frequency of use of small blocks in the previous slice at same temporal layer is compared to a threshold (typically 25%). If it is lower than the threshold, then a constraint is put on the minABTSize value. Typically, this value is set to 16 in that case. This will disallow the use of ABT in blocks of size 12 or lower in the next slice to process.

According to an embodiment, the methods of FIG. 12 and FIG. 13 only take place on the encoder side. In that case, the maxABTSize and/or minABTSize quantities are signaled in the bit-stream, to let the decoder know in which block sizes the ABT partitioning is allowed or not.

According to an embodiment, the methods of FIG. 12 and FIG. 13 only take place on the encoder side, but no maxABTSize and/or minABTSize quantities are signaled in the bit-stream. In that case, the usual CU splitting syntax is used, regardless the frequency of ABT usage in previous slices in the considered sequence and temporal layer.

According to an embodiment, the methods of FIG. 12 and FIG. 13 take place on both the encoder and the decoder side, and the method performed at the decoder is identical to the method performed at the encoder side. In such case, the signaling of the maxABTSize and/or minABTSize in the slice header can be avoided, saving a few bits.

FIG. 14, FIG. 15 and FIG. 16 show non-limiting exemplary methods than can be used, both on the encoder and on the decoder side, in an identical way on both sides, to limit the use of ABT partitioning modes. These methods take into account the width and height of a CU being processed, and the constraints previously computed maxABTSize and minABTSize.

In the method of FIG. 14 all ABT partitioning modes are disallowed if at least one of the width and height of the CU exceeds maxABTSize or has a smaller value than minABTSize while in the variant of FIG. 15 the ABT partitioning modes are disallowed if both the width and height of the CU exceeds maxABTSize or has a smaller value than minABTSize. The variant of FIG. 16 allows to separately disallow vertical or horizontal ABT split modes.

The above disclosed methods used to enable or disable the use of ABT partitioning in some block size advantageously reduce the number of split modes being evaluated during the rate distortion optimization process, thus making it faster. Furthermore, this encoder speed-up comes with very limited loss in coding efficiency.

New Heuristics for Fast Rate Distortion Search of the Coding Tree

This section presents an additional encoder speeding-up method with regards to the selection of the asymmetric binary split modes HOR_UP, . . . , VER_RIGHT, during the rate distortion search of the coding tree at the encoder side.

This method comprises deactivating the ABT split modes in case the already tested split modes (QT_SPLIT, HOR, VER) led to a best CU, which is in skip mode and is not partitioned into sub-CUs. In that case and if the symmetric binary split mode VER of HOR has been tested, then the ABT split modes are not evaluated for the current CU.

Moreover, if the horizontal binary symmetric split mode HOR has been tested and if the best CU found so far is not partitioned and has null residual, then the horizontal asymmetric split modes HOR_UP and HOR DOWN are deactivated.

Similarly, if the vertical binary symmetric split mode VER has been tested and if the best CU found so far is not partitioned and has null residual, then the vertical asymmetric split modes VER_LEFT and VER_RIGHT are deactivated.

Support for ABT with Only Transform Sizes Equal to a Power of 2

The asymmetric binary tree splitting, in the way it has been proposed previously, introduces additional transform sizes to the QTBT design. To avoid increasing the number of transforms that are supported in the decoder design, it is necessary to process the residual transform, quantization and entropy coding over a block size equal to a power of 2 in width and height.

At least one embodiment proposes methods to split a coding unit with a size equal to a multiple of 3 in width or height, into transform units with a size equal to a power of 2. Several arrangements of transform units inside the considered CU are disclosed, and correspond to the proposed embodiments.

According to a first embodiment shown in FIG. 17, a parent CU with a reference size normalized to "1" is split according to an asymmetric split mode HOR_UP into two smaller sub-CUs (in the following also simply referred to as CUs). The shown example is based on the HOR_UP mode, however, the same method could be applied for the other asymmetric split modes.

Due to the asymmetric splitting, one the two CUs has a size which is a multiple of 3 in width or height, in the shown example the lower CU. The CU with a size being a multiple of 3 in width or height is split into two TUs (Transform Units) with splitting ratio (1/3, 2/3) compared to the CU, thus with relative size ¼ and ½ relative to the parent CU. Thus, this leads to two TUs with sizes equal to a power of 2. As shown in FIG. 17, the smallest TU is in this case in the first position, the largest TU in the second position. According to another embodiment illustrated in FIG. 18, the splitting ratios between the CU and the TUs is (2/3, 1/3), which means the largest TUs appears first in the considered CU.

According to a third embodiment the CU is split into three TUs with relative size (1/3, 1/3, 1/3) compared to the considered CU. This is shown in FIG. 19. This third embodiment may be relevant to intra CUs, because, as in HEVC, when a CU is split into TUs then the intra prediction is performed on a TU-to-TU basis. This means a given TU is first coded and reconstructed before intra predicting the TU that follows in the considered CU. Thus, this splitting into three small-size TU may be helpful to ensure good intra prediction, which performs better as the predicted block size is smaller.

According to a fourth embodiment, the partitioning into transform units is arranged in a way that the resulting overall block partitioning emulates the Triple Tree partitioning from a topology viewpoint. This is illustrated on FIG. 20. To that end, the method comprises the following steps:

Obtain the one or two Asymmetric split m ode(s) that led to the current CU with size equal to a multiple of 3 in width and/or height.

For each asymmetric split mode obtained at the preceding step, divide the current CU into two TUs, according to the asymmetric mode that is the opposite mode of the obtained Asymmetric split mode. Several cases of this embodiment are illustrated in FIG. 20. Therefore, if the considered Asymmetric CU splitting was (1/4, 3/4), then the TU splitting is performed with the ratio (2/3, 1/3). Moreover, if the Asymmetric CU split was (3/4, 1/4), then the TU splitting is (1/3, 2/3).

Moreover, in the case of a CU which size is a multiple of 3 in width AND height, in the embodiment of FIG. 20, the CU is being divided into 4 Transform Units.

According to a further embodiment, the (1/3, 1/3, 1/3) TU splitting is used in Intra CU only.

According to a further embodiment, the TU splitting of an Intra CU depends on the intra prediction direction. It is chosen such that the smallest TU is located nearest to the reference samples used to intra predict the considered CU.

According to a further embodiment, the TU splitting of an Intra CU is derived from the intra prediction direction. It is chosen such that the largest TU Is located nearest to the reference samples used to intra predict the considered CU.

According to a further embodiment, the TU splitting with minimum rate distortion cost is chosen and is being signaled in the bitstream.

According to a further embodiment, in case the prediction of the current TU needs some prediction parameters derived from some surrounding information around the considered CU, then the derivation of this prediction parameters is performed on a TU-to-TU basis. This embodiment typically concerns the cross-component linear model based intra prediction (known as the LM mode), or the template matching bases inter prediction.

Note that the concept of splitting a CU, which size is a non-power-of-2 in width or height, into transform units with a size equal to a power of 2, may not be restricted to the ABT case with CU split ratios (1/4, 3/4). It may apply to some other asymmetric binary tree split cases. For instance, the asymmetric binary split of a CU may consist in splitting a CU in width or height with splitting ratios equal to 3/8 and 5/8. In such case two sub-CU with respective sizes equal to $3 \cdot 2^n$ and $5 \cdot 2^n$ result from this splitting. Then, these 2 Tus may be split into transform units, in the same orientation as the above asymmetric binary CU split. The first sub-CU may be divided into two TU with splitting ratios 1/3 and 2/3 in the orientation. The second sub-CU may be divided into two TU with splitting ratios 3/5 and 2/5.

Additional Embodiments and Information

This document describes a variety of aspects, including tools, features, embodiments, models, approaches, etc.

Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

The aspects described and contemplated in this document can be implemented in many different forms. FIGS. 21, 22 and 23 below provide some embodiments, but other embodiments are contemplated and the discussion of FIGS. 21, 22 and 23 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this document can be used to modify modules, for example, the image partitioning, transform/inverse transform, intra prediction, entropy coding, and/or decoding modules (102, 235, 125, 250, 160, 260, 145, 230), of a video encoder 100 and decoder 200 as shown in FIG. 21 and FIG. 22. Moreover, the present aspects are not limited to WC or HEVC, and can be applied, for example, to other standards and recommendations, whether pre-existing or future-developed, and extensions of any such standards and recommendations (including WC and HEVC). Unless indicated otherwise, or technically precluded, the aspects described in this document can be used individually or in combination.

Various numeric values are used in the present document, for example, for maxABTSize or MinABTsize. The specific values are for example purposes and the aspects described are not limited to these specific values.

FIG. 21 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 22 illustrates a block diagram of a video decoder 200. In the decoder 200, a bitstream is decoded by the decoder elements as described below. Video decoder 200 generally performs a decoding pass reciprocal to the encoding pass as described in FIG. 21. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 23 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit, multiple ICs, and/or discrete components. For example, in at least one embodiment, the processing and encoder/decoder elements of system 1000 are distributed across multiple ICs and/or discrete components. In various embodiments, the system 1000 is communicatively coupled to other similar systems, or to other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or WC (Versatile Video Coding).

The input to the elements of system 1000 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements necessary for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the 120 bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed to the system 1000, in various embodiments, using a Wi-Fi network such as IEEE 802.11. The Wi-Fi signal of these embodiments is received over the communications channel 1060 and the communications interface 1050 which are adapted for Wi-Fi communications. The communications channel 1060 of these embodiments is typically connected to an access point or router that provides access to outside networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130.

The system 1000 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1000. In various embodiments, control signals are communicated between the system 1000 and the display 1100, speakers 1110, or other peripheral devices 1120 using signaling such as AV.Link, CEC, or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device, for example, a television. In various embodiments, the display interface 1070 includes a display driver, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

FIG. 24 illustrates an exemplary encoding method 1200 according to a general aspect of at least one embodiment. A block of a picture of the video to be encoded is accessed. In step 1210, as described above, the block is partitioned into block partitions, wherein at least one block partition has a size equal to a positive integer different from a power of 2 in width and/or height, in particular a multiple of 3 in width and/or height. At step 1220, a residual is generated by predicting the block partitions, in particular by intra- or interprediction, and subtracting the prediction from the block partitions. At step 1230, the generated residual is split into at least two residual blocks with a size equal to a power of 2 in width and height. At step 1240, the at least two residual blocks are transformed by a two dimensional block transform into transform coefficients, the transform coefficients are quantized and entropy coded. The above method can repeat until all blocks in the picture having a size equal to a multiple of 3 in width and/or height have been encoded.

The decoding method will to some extent perform the operations in the opposite order and do "inverse" operations as shown in FIG. 25, which illustrates an exemplary decoding method 1300 according to a general aspect of at least one embodiment. In step 1310 a bitstream comprising quantized transform coefficients, as well as motion vectors and other syntax elements, is received, for example via the input block 1130 of system 1000 illustrated in FIG. 23. The quantized transform coefficients are entropy decoded, de-quantized and inverse transformed in step 1320 to obtain residual blocks with a size equal to a power of 2 in width and height. At least two residual blocks are merged in step 1330 to reconstruct a residual for a block partition having a size equal to a positive integer different from a power of 2 in width and/or height, in particular a multiple of 3 in width and/or height. Finally, by predicting the block partitions and combining the residuals with the predicted block partitions in step 1340 a block of the picture is reconstructed.

The above presents a simplified decoding and coding method in order to provide a basic understanding of some aspects of subject matter embodiments. As such, the encoding and decoding step are not limited to the above described sub-steps. Additional features, variants and advantages of the present disclosure will be made apparent from the following detailed description of illustrative embodiments.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, extracting a picture from a tiled (packed) picture, determining parameters for Asymmetric Binary Tree partitioning and then determining picture split mode according to the determined parameters for ABT.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, for example, MaxABTsize and/or MinABTsize, are descriptive terms. As such, they do not preclude the use of other syntax element names. Other terms such as TCH_LARGE_BLOCK or TCH_SMALL_BLOCK may be used.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "determining" various pieces of information. Determining the information can include one or more of, for example, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for ABT. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We have described a number of embodiments. These embodiments provide, at least, for the following generalized claims, including all combinations, across various different claim categories and types:

Asymmetric Binary Tree Partitioning is constrained/parametrized to improve compression efficiency in the decoder and/or encoder.

Asymmetric Binary Tree Partitioning is responsive to size of the Coding Unit to process in the decoder and/or encoder.

Asymmetric Binary Tree Partitioning is responsive to the picture boundary in the decoder and/or encoder.

Block Partitioning prioritizes the split mode that maximizes the block size internal to the picture.

Block Partitioning prioritize ABT over BT in case the split boundary matched the picture boundary.

Asymmetric Block Partitioning is enabled/disabled in the decoder and/or encoder.

Enabling or Disabling Asymmetric Binary Tree Partitioning is based on average usage of large/small block in already coded slices.

Enabling or Disabling Asymmetric Binary Tree Partitioning comprises setting a maximum and/or a minimum CU size (in width or height) thus determining a range for which the asymmetric binary partitioning is allowed, Enabling or Disabling Asymmetric Binary Tree Partitioning is applied to non-Intra slice (ie Inter P or B slices), Setting a maximum and/or a minimum CU size (in width or height), called MaxABTsize and/or MinABTsize, responsive to average usage of large/small block in already coded slices, The maximum and/or a minimum CU size in already coded slices is computed at the encoder, coded at the encoder and transmitted to the decoder/received by the decoder.

The maximum and/or a minimum CU size in already coded slices is computed at the encoder and at the decoder.

The maximum and/or a minimum CU size in already coded slices is computed for a given temporal layer.

The maximum and/or a minimum CU size in already coded slices is computed for a given temporal layer is based on statistics (percentage of blocks with size above maximum CU size and/or below a minimum CU size).

Inserting in the signalling syntax elements that enable the decoder to identify maximum and/or a minimum CU size.

Selecting, based on these syntax elements, the split modes to apply at the decoder.

According to a further embodiment, TU splitting is adapted to support ABT with only power of two transform sizes wherein (1/3, 1/3, 1/3) CU partitioning into Tus Smallest subTU as the first subTU in the partitioning Largest subTU as the first subTU in the partitioning TT emulation with Tus inside a CU multiple of 3

Intra case: smallest subTU near to the reference samples, which depend on the Intra prediction direction Infer the TU partitioning according to the coding mode of the considered Coding Unit Rate distortion optimized choice between various subTU arrangements, and associated signaling In case of Prediction modes that implies the spatial propagation/derivation of the prediction parameters of a block, proceed on a TU-to-TU basis A bitstream or signal that includes one or more of the described syntax elements, or variations thereof.

Inserting in the signaling syntax elements that enable the decoder to adapt residues in a manner corresponding to that used by an encoder.

Creating and/or transmitting and/or receiving and/or decoding a bitstream or signal that includes one or more of the described syntax elements, or variations thereof.

A TV, set-top box, cell phone, tablet, or other electronic device that performs image partitioning of images according to any of the embodiments described.

A TV, set-top box, cell phone, tablet, or other electronic device that performs image partitioning according to any of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded image, and performs image partitioning according to any of the embodiments described.

A TV, set-top box, cell phone, tablet, or other electronic device that receives (e.g. using an antenna) a signal over the air that includes an encoded image, and performs image partitioning according to any of the embodiments described.

Various other generalized, as well as particularized, embodiments and claims are also supported and contemplated throughout this disclosure.

The invention claimed is:

1. A method comprising decoding a picture, wherein the picture is divided into one or more blocks of samples and wherein a block of samples is further partitioned into at least two block partitions, said decoding further comprising:
   receiving in video data quantized transform coefficients;
   entropy decoding, de-quantizing and inverse transforming the transform coefficients to obtain a residual of block partitions; and
   reconstructing a block of samples based on a prediction of the block partitions and the residual of block partitions,
   wherein at least one block partition is obtained using, based on a block of samples being located on a border of the picture, asymmetric binary partitioning as implicit split for the block of samples, wherein asymmetric binary partitioning as implicit split is a sole split mode type allowed for the at least one block partition.

2. The method according to claim 1, wherein at least one block partition has a size equal to a multiple of 3 in width or height.

3. The method according to claim 2, wherein inverse transforming the transform coefficients to obtain the residual of block partitions comprises merging at least two residual blocks with a size equal to a power of 2 in width and height into the residual of block partitions.

4. The method according to claim 3, wherein a residual of a block partition with a size equal to a multiple of 3 in width or height is obtained by one of:
   merging two residual blocks wherein a first of the two residual blocks has twice a size as a second of the two residual blocks;
   merging three residual blocks of equal size; or
   merging four residual blocks.

5. The method according to claim 4, wherein merging three residual blocks of equal size is used for an intra-predicted block partition.

6. The method according to claim 5, wherein merging for the intra-predicted block partition depends on an intra prediction direction.

7. A device for decoding comprising a memory and one or more processors configured to decode a picture, the picture being divided into one or more blocks of samples and a block of samples being further partitioned into at least two block partitions, said one or more processors being further configured to:
   receive in video data quantized transform coefficients;
   entropy decode, de-quantize and inverse transform the transform coefficients to obtain a residual of block partitions; and
   reconstruct a block of samples based on a prediction of the block partitions and the residual of block partitions,
   wherein at least one block partition is obtained using, based on a block of samples being located on a border of the picture, asymmetric binary partitioning as implicit split for the block of samples, wherein asymmetric binary partitioning as implicit split is a sole split mode type allowed for the at least one block partition.

8. The device according to claim 7, wherein at least one block partition has a size equal to a multiple of 3 in width or height.

9. The device according to claim 8, wherein the residual of block partitions with a size equal to a multiple of 3 in width or height is obtained by merging at least two residual blocks with a size equal to a power of 2 in width and height into the residual of block partition.

10. The device according to claim 9, wherein a residual of a block partition with a size equal to a multiple of 3 in width or height is obtained by one of:
    merging two residual blocks wherein a first of the two residual blocks has twice a size as a second of the two residual blocks;
    merging three residual blocks of equal size; or
    merging four residual blocks.

11. The device according to claim 10, wherein merging three residual blocks of equal size is used for an intra-predicted block partition.

12. The device according to claim 11, wherein merging for the intra-predicted block partition depends on an intra prediction direction.

13. A method comprising encoding a picture, wherein the picture is divided into one or more blocks of samples, said encoding further comprising:
    determining that a block of samples is located on a border of the picture;
    based on determining that the block of samples is located on the border of the picture, determining asymmetric binary partitioning as implicit split for the block of samples, wherein asymmetric binary partitioning as implicit split is a sole split mode type allowed for the block of samples;
    performing asymmetric binary partitioning on the block of samples to obtain block partitions;
    obtaining a residual of the block partitions based on a difference between a prediction of the block partitions and the block partitions; and
    transforming the residual of the block partitions into transform coefficients, quantizing the transform coefficients, and entropy coding of the transform coefficients.

14. The method according to claim 13, wherein at least one block partition has a size equal to a multiple of 3 in width or height.

15. The method according to claim 14, wherein transforming the residual of the block partitions into transform coefficients further comprises splitting the residual into at least two residual blocks with a size equal to a power of 2 in width and height.

16. The method according to claim 15, wherein a residual of a block partition with a size equal to a multiple of 3 in width or height is split into at least two residual blocks according to one of:
    splitting the residual of the block partition into two residual blocks wherein a first of the two residual blocks has twice a size as a second of the two residual blocks;
    splitting the residual of the block partition into three residual blocks of equal size; or
    splitting the residual of the block partition into four residual blocks.

17. The method according to claim 16, wherein splitting the residual of the block partition into three residual blocks of equal size comprises splitting a residual of an intra-predicted block partition.

18. The method according to claim 17, wherein splitting the residual of the intra-predicted block partition depends on an intra prediction direction.

19. A device for encoding comprising a memory and one or more processors configured to encode a picture, wherein the picture is divided into one or more blocks of samples, said one or more processors being further configured to:
    determine that a block of samples is located on a border of the picture;

based on determining that the block of samples is located on the border of the picture, determine asymmetric binary partitioning as implicit split for the block of samples, wherein asymmetric binary partitioning as implicit split is a sole split mode type allowed for the block of samples;

perform asymmetric binary partitioning on the block of samples to obtain block partitions;

obtain a residual of the block partitions based on a difference between a prediction of the block partitions and the block partitions; and transform the residual of the block partitions into transform coefficients, quantize the transform coefficients, and entropy code of the transform coefficients.

20. The device according to claim 19, wherein at least one block partition has a size equal to a multiple of 3 in width or height.

21. The device according to claim 20, wherein the residual of the at least one block partition is obtained by splitting the residual of the at least one block partition into at least two residual blocks with a size equal to a power of 2 in width and height.

22. The device according to claim 21, wherein a residual of a block partition with a size equal to a multiple of 3 in width or height is split into at least two residual blocks according to one of:

split the residual of the block partition into two residual blocks wherein a first of the two residual blocks has twice a size as a second of the two residual blocks;

split the residual of the block partition into three residual blocks of equal size; or split the residual of the block partition into four residual blocks.

23. The device according to claim 22, wherein splitting the residual of the block partition into three residual blocks of equal size comprises splitting a residual of an intra-predicted block partition.

24. The device according to claim 23, wherein splitting the residual of the intra-predicted block partition depends on an intra prediction direction.

25. The method according to claim 1, wherein the at least one block partition obtained using asymmetric binary partitioning is exclusively partitioned using asymmetric binary partitioning.

26. The device according to claim 7, wherein the at least one block partition obtained using asymmetric binary partitioning is exclusively partitioned using asymmetric binary partitioning.

27. The method of claim 13, wherein determining asymmetric binary partitioning as implicit split for the block of samples comprises determining asymmetric binary partitioning is exclusively permitted to be performed on the block of samples.

28. The device of claim 19, wherein the one or more processors configured to determine asymmetric binary partitioning as implicit split for the block of samples is further configured to determine asymmetric binary partitioning is exclusively permitted to be performed on the block of samples.

* * * * *